Aug. 31, 1943.   I. MULLER   2,328,027
MANUFACTURE OF SEPARATORS
Filed June 1, 1940
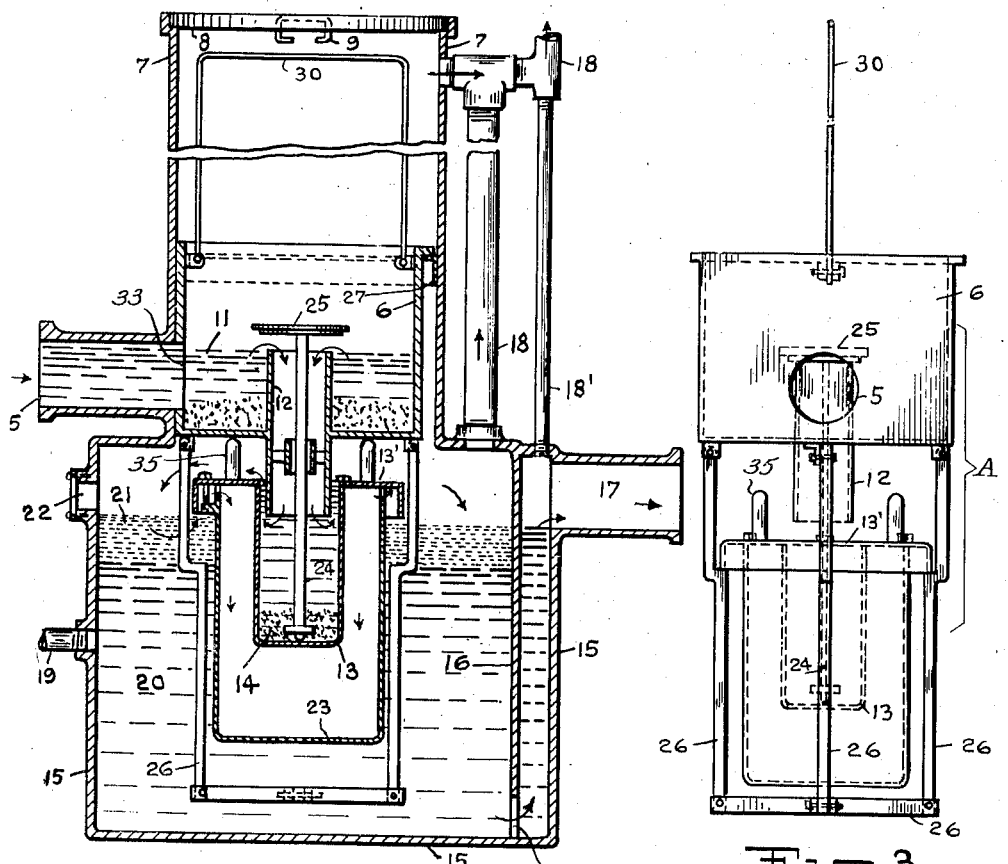
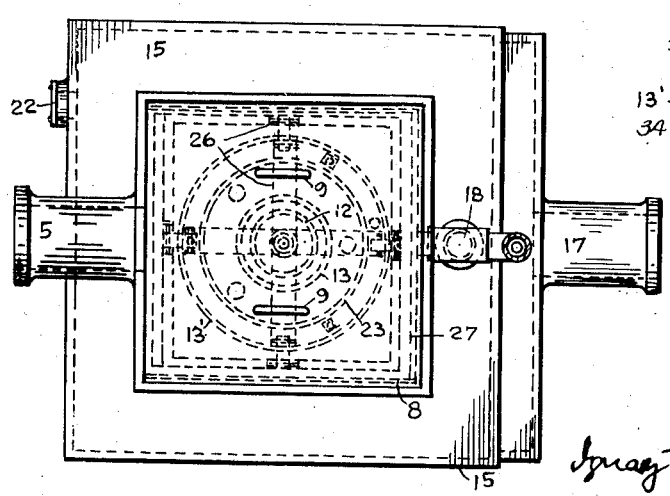
Ignacy Muller INVENTOR.

Patented Aug. 31, 1943

2,328,027

UNITED STATES PATENT OFFICE 2,328,027

MANUFACTURE OF SEPARATORS

Ignaz Muller, New York, N. Y.

Application June 1, 1940, Serial No. 338,365

6 Claims. (Cl. 210—54)

The invention relates to a trap or separator for treating liquids such as sewage, and particularly drainage, containing two types of contaminating substances, for instance solids and light liquids.

It is the object of the present invention to control the operation of the separating equipment and to interrupt the discharge of the sewage by the weight of the solid contaminations.

It is a further object of the invention to exert this control by either of the two groups of the contaminations above referred to.

It is also the object of this invention to construct the means by which this control is attained as a standard unit.

It is a further object of this invention to produce a unit for sewage separators wherein the contaminations of the sewage accumulate and which may be used without constructional changes for any type of sewage separators independently upon their size or shape.

Further objects and advantages of my improved sink water trap or sewage separator will be apparent from the following detailed description in connection with the accompanying drawing illustrating by way of example one modification of the invention.

In the drawing,

Fig. 1 is a vertical sectional view of a sink water trap or oil separator in which my invention is embodied, Fig. 2 is a plan view thereof, Fig. 3 is a vertical elevation of the removable interior parts of the separator, Fig. 4 is an enlarged sectional detail.

The separator illustrated in the drawing comprises tank 15, provided with a seal 16, which has a passage 36 at its lower end adapted to hold a sealing liquid column 20, 21 inside the tank, used at the same time as a separating space.

The tank 15 is provided with a feed pipe 5 coming from a floor drain or other sources, with a water outlet channel 17, leading to the sewer line, with a connection tube 19 for a pump for drawing off water 20 or oil 21, and with a tube 22 as an outlet for conveying oil to a separate oil storage reservoir.

The upper part of tank 15 comprises an extension 7 which is provided with suitable means like bands or flanges 27 to hold the solids collector or bucket 6 and its opening 33 in alinement with the feeding pipe 5. The usual vent pipe 18 is connected by pipe 18' with the sewer line 17 to prevent syphoning. The bucket 5 with its handle 30 is removable through the top of extension 7 which is provided with a removable cover 8 and with handle 9; cover 8 is in alinement with the garage floor.

A tube 12 is inserted into the bottom 10 of collector 6. This tube forms a passage from the collector into receptacle 13. Receptacle 13 is situated within floating chamber 23 which is located underneath the solids collector 6. A controlling member consisting of a valve disc 25 and a stem 24 is located in tube 12. The upper end of the tube forms a seat for valve 24, 25 in its closed position; in its open position the valve is supported on the bottom of chamber 13.

The latter is preferably attached to cover 13' of a floating chamber 23 (Figs. 1 and 4) which is provided at its top with overflow openings 31. Screws 34 secure cover 13' to the wall of receptacle 23 and connect receptacles 13 and 23. Cover 13' is provided with a vent 32. 26 indicates a cage suitably attached to bucket 6 in order to guide chambers 23 and 13 in their movements and to enable them to be inserted and removed together with the bucket 6 and the other parts shown in Fig. 3 as unit A.

The operation of the separator is as follows:

Tank 15 is filled with drainage water up to the lower level outlet 17. As soon as the unit shown in Fig. 3 is positioned in the tank, the float ascends to its upper position until stops 35 hit the bottom of bucket 6. The garage drainage enters in the direction of the arrow into tank 15 through feed tube 5 (Fig. 1) and flows through inlet 33 into the solids collecting bucket 6. The liquid accumulates in bucket 6 until level 11 is reached; then it overflows into outlet conduit 12 in the direction of the arrows. The solids contained in the entering liquid settle on the bottom 10 of receptacle 6 to be periodically removed; when they are not removed they fall downwards through tube 12 into chamber 13 and accumulate therein as shown by 14. When the weight of the solids accumulated at 14 counteracts the buoyancy of the floating receptacle 23 which has been lifted upward during the placement of unit A into the drainage filled separating tank floating receptacle 23 sinks downwards. At the same time valve 24, 25 is lowered closing the admission to tube 12. The sewage fills up drainage tube 5 and flows from there upon the floor of the garage indicating that solids collector 6 should be cleaned and removed for this purpose.

It will be readily understood that by inserting unit A into the tank 15 of the waste water trap, Fig. 1, the chambers 23 and 13 will be kept afloat by their buoyancy and will move upwardly inside the cage 26 until the lugs 35 of the cover 13' touch the bottom of bucket 6 in which position stem 24 of valve 25 touching the bottom of chamber 13 will keep the tube 12 open.

The unit A is removed by opening cover 8 and lifting the unit A through extension 7 from tank 15. The solids are removed from the unit and the same is again introduced into the separating tank; the floating receptacle 23 is lifted upwards by its buoyancy together with valve 24, 25 and the inflow of the sewage commences again.

The light liquids containing sewage overflowing the upper edge of tube 12 flows in the direction of the arrows over cover 13' into the tank 15. The light liquids which are separated by their lower specific weight from the sewage water accumulate on the upper surface of the water as layer 21. As soon as a sufficient amount of light liquids is accumulated to reach openings 31 it flows into the inner space of the floating receptacle 23. Hereby this receptacle with valve 24, 25 is lowered and further admission of sewage into the separator is interrupted.

Unit A is removed in the manner described above and the light liquids are emptied out from tank 15 and receptacle 23. Then the unit A is again introduced into the separating tank and the inflow of the sewage and the separation of the contaminations is commenced again.

Hence, it is apparent that the discharge of the separator may be automatically controlled by the accumulation of contaminations which have a higher specific weight than the sewage water and also by the accumulation of the light liquids.

The great advantage of my invention consists therein that the elements controlling the automatic operation of the discharge are constructed as a single unit to be inserted and removed through the cover opening or manhole of a sink water trap or separator.

This unit can be constructed on a standard basis. It can be used for any type of separating tanks independently upon their size or shape. This could not be accomplished up to now because the walls of the separating tank were used as a guiding means for the floating receptacle.

Various changes and modifications may be made to the details contained in the description of my invention for the separation of liquids containing contaminations which have a higher and a lower specific weight than water, without departing from the broader spirit and scope thereof, as set forth in the following claims.

I claim:

1. In a trap for treating liquids such as sewage, a tank, a sealing liquid in said tank, a feed associated with the said tank, outlets for the treated liquid from the said tank communicating with the lower part of same, a solids collecting bucket, an inlet for the liquid in said bucket, means for holding said bucket and its inlet in alinement with said feed, a solids accumulating receptacle underneath the said bucket adapted to act as a float when inserted into the said sealing liquid, an outlet conduit from the said bucket into the said receptacle the latter being adapted to be sunk by a predetermined accumulation of solids, closing means carried by the said receptacle adapted to close the said outlet conduit as a result of the sinking of the receptacle and hereby to interrupt the flow from the said bucket into the said receptacle.

2. In a trap for treating liquids such as sewage containing two types of contaminations, such as solids and light liquids, comprising a tank, a sealing liquid in said tank, a feed to said tank, outlets for the treated liquid from said tank communicating with the lower part of the same, a solids collecting bucket, an inlet in said bucket, means for holding said bucket and its inlet in alinement with said feed, a solids and light liquids accumulating receptacle underneath the said bucket adapted to act as a float when inserted into the said sealing liquid, an outlet conduit leading from the said bucket into the said accumulating receptacle, the latter being adapted to be sunk by the predetermined accumulation of at least one type of the contaminations, closing means carried by the said receptacle adapted to close the said outlet conduit as a result of the sinking of the receptacle and to hereby interrupt the flow from the said bucket into the said receptacle.

3. In a trap for treating liquids such as sewage containing two types of contaminations, comprising a tank, a sealing liquid in said tank, a feed for the liquid to said tank, outlets for the treated liquid from said tank communicating with the lower part of the same, a solids collecting bucket, an inlet in said bucket, means for holding said bucket and its inlet in alinement with said feed, a receptacle underneath the said bucket adapted to act as a float when inserted into said sealing liquid, means attached to said bucket to hold the same and the said receptacle in alinement and to permit an upward and downward displacement of the latter, an outlet conduit leading from the said bucket into the said receptacle, the latter being adapted to be sunk by the predetermined accumulation of at least one type of the contaminations, closing means carried by said receptacle adapted to close the said outlet conduit as a result of the sinking of the receptacle and to hereby interrupt the flow from the said bucket into the said receptacle.

4. A removable unit to be inserted in a trap containing a sealing liquid for treating liquids such as sewage containing two types of contaminations, such as solids and light liquids, said unit comprising a solids collecting bucket, an inlet into said bucket for the liquid to be treated, a solids and a light liquids accumulating receptacle underneath the said bucket adapted to act as a combined float when inserted into the trap containing the sealing liquid, means attached to said bucket to hold the same and the said receptacle in alinement, an outlet conduit leading from the said bucket to the said solids collecting receptacle, overflow inlet conduits for the light liquids into the said light liquids collecting receptacle, the latter being adapted to be sunk by the predetermined accumulation of at least one type of the contaminations, closing means carried by said receptacle adapted to close the said outlet conduit as a result of the sinking of the receptacle and to hereby interrupt the flow from the said bucket into the said receptacle.

5. A removable unit to be inserted in a trap containing a sealing liquid for treating liquids, such as sewage containing solid contaminations, said unit comprising a solids collecting bucket, an opening in said bucket for the entrance of the liquid to be treated, a solids accumulating receptacle underneath the said bucket adapted to act as a float when inserted into the trap containing the sealing liquid, means attached to the said bucket to hold the same and the said receptacle in alinement, an outlet conduit leading from the said bucket into said receptacle, the latter being adapted to be sunk by a predetermined accumulation of the solids, closing means carried by the said receptacle adapted to close the said outlet conduit as a result of the sinking of the receptacle and to hereby interrupt the flow from the said bucket into the said receptacle.

6. A removable unit to be inserted in a trap containing a sealing liquid for treating liquids, such as sewage containing light liquids, said unit comprising a solids collecting bucket, an opening for the introduction of the liquid to be treated in the said bucket, a receptacle underneath the said bucket adapted to act as a float when inserted into the sealing liquid of the trap, means attached to said bucket to hold the same and the said receptacle in alinement, an outlet conduit leading from the said bucket to the said receptacle, overflow inlet conduits for the light liquids into the said receptacle, the latter being adapted to be sunk by a predetermined accumulation of the light liquids, closing means carried by the said receptacle adapted to close the said outlet conduit as a result of the sinking of the receptacle and to hereby interrupt the flow from the said bucket into the said receptacle.

IGNAZ MULLER.